United States Patent Office 3,265,647
Patented August 9, 1966

3,265,647
TROWELABLE EPOXY-POLYAMIDE COMPOSITION WITH GRADED FILLER
Louis F. Schaeffer, Jr., Landisville, and Alger J. Slosser, East Hempfield Township, Lancaster County, Pa., assignors to Armstrong Cork Company, Lancaster, Pa., a corporation of Pennsylvania
No Drawing. Filed Jan. 29, 1962, Ser. No. 169,607
5 Claims. (Cl. 260—18)

This invention relates generally to a trowelable composition suitable for use as wear resistant coatings on stair treads, roadways, vehicle interiors, floors, and ramps. More particularly, the invention relates to a trowelable mixture comprising a resin binder and a filler. Still more particularly, the invention relates to a trowelable, easily workable covering composition possessing excellent "slip" in that it will not adhere to the trowel or other tool used to work the composition as the composition is applied over a surface to be covered.

Compositions comprising epoxy resins complete with curing systems and a filler are known to be used as pavements for floors, roads, and the like. U.S. 2,948,201—Nagin et al., issued August 9, 1960, describes such a composition with particular emphasis on the use of abrasive grits or grains to impart excellent slip or skid resistance to the pavement. These compositions give excellent results for the purpose intended once they are installed. However, the installation of such compositions has presented problems in the art.

The epoxy resin-coated filler particles are sticky in nature and difficult to work with a trowel or other suitable spreading device. Not only is undue effort needed in order to spread the composition over the surface to be coated, but the composition adheres to the trowel or other spreading tool. This is to be expected since epoxy resins themselves are notoriously excellent adhesives for metals and are widely used to adhere tenaciously opposing metallic surfaces. It has in the past been necessary frequently to wipe the trowel that is used to spread the composition. In view of the sticky and tenacious adherence of the epoxy resins to the metal face of the trowel, it has also been necessary frequently to dip the trowel into an epoxy solvent such as a ketone, toluol, or some other hydrocarbon solvent in order to keep the surface of the trowel lubricated. This adherence of the material to the trowel, the need for frequent wiping of the trowel, and the difficulty of physically spreading the epoxy-bonded composition, causes an extraordinary waste of time, effort, and money in the application of these highly desirable compositions.

It is apparent there is a need for an epoxy-bonded paving composition which is easily workable and trowelable, one which can be applied and troweled with the same ease as ordinary cement.

It is the primary object of the present invention to supply this need. It is a further object to present an epoxy-bonded, filled composition which is short-bodied in nature, easily spreadable over a wide variety of surfaces, which will not adhere to the trowel or other spreading tool, and which possesses to a high degree the property of "lubricity"; lubricity means freedom from friction.

These objects are attained in an unexpected manner. The invention contemplates a trowelable composition comprising a well blended mixture of a curable epoxy resin having a viscosity in the range of about 400–3000 centipoises, the epoxy resin being a polyglycidyl ether of a polynuclear phenol, a curing system for the epoxy resin, the curing system having a viscosity in the range of 5000–18000 centipoises including a polymeric polyamide resin, and finally, a graded filler having a sieve analysis of

| U.S. standard sieve No.: | Percent by weight retained |
|---|---|
| 14 | 4– 7 |
| 16 | 12–18 |
| 18 | 20–26 |
| 20 | 8–22 |
| 30 | 14–30 |

As an additional limitation on the graded filler, substantially 100% by weight must pass through a No. 10 sieve, and a maximum of 35% by weight of the filler pass through a No. 30 sieve.

The epoxy resins to be used in the composition of the present invention are known items of commerce. These epoxy resins are complex polymeric reaction products of polyhydric phenols with polyfunctional halohydrins such as epichlorohydrin and glycerol dichlorhydrin. Usually the difunctional chlorhydrin is used in proportions in excess of that equivalent to the polyhydric phenol and less than that which is twice the equivalent amount. The reaction between the chlorhydrin and the polyhydric phenol is carried out in the presence of caustic alkali which is usually employed in at least the quantity necessary to combine with the halogen liberated from the halohydrin and usually is employed in excess. The products obtained contain terminal epoxy groups or terminal epoxy groups and terminal primary hydroxyl groups. In the complex reaction mixture, the terminal epoxy groups are generally in excess of the terminal primary hydroxyl groups. Typical polyhydric phenols include resorcinol and preferably the various bis-phenols resulting from the condensation of phenol with aldehydes such as formaldehyde, and acetaldehyde, the ketones such as acetone, methyl ethyl ketone, and the like.

The molecular weight, and hence the viscosity, of the epoxy resins may be controlled by the relative proportions of the reactants as well as by the extent to which the reaction is completed. For use in the present invention, the viscosity of the resin is critical and should be in the range of 400–3000 centipoises at 75° F., and preferably 1400 centipoises plus or minus 200 centipoises. A viscosity of less than 500 centipoises yields a trowelable composition which sticks to the trowel and produces a non-uniform cured paving due to the flowing of the epoxy resin binder. If the viscosity of the epoxy resin is greater than 3000 centipoises, workability is decreased due to trowel dragging, and the mixture sags on standing. The needed viscosity can be attained by blending epoxy resins having different viscosities to produce a thoroughly blended mixture having a viscosity within the requisite range.

The curing system for the epoxy resin must have a viscosity in the range of 5000–18000, and preferably 13000–18000 centipoises. The primary component of the curing system will be a polyamide resin. The polyamide resins are those derived from polymeric fat acids and aliphatic polyamines. Typical of these polyamide resins are those made by reacting polymeric fat acids with ethylene diamine and/or diethylene triamine. It is possible to produce resins having terminal amine groups or terminal carboxyl groups or in which some of the terminal groups are amine groups while others are carboxyl groups. Since both amine groups and carboxyl groups are useful in curing the epoxy resins, it will be apparent that a wide variety of these polyamides are useful for this purpose, providing the viscosity is within the stated limits. Since the amine groups react more rapidly in curing the epoxy resins, it is generally preferred to employ polyamides containing excess amine groups. Slower curing may be obtained by use of these polyamides having excess carboxyl groups over the amine groups. The amount of free amine groups or free carboxyl groups measured as amine number and acid number respectively may be determined by titration. The amine number is defined as the number of milligrams of potassium hydroxide equivalent to the free amine groups present in one gram of the resin. The acid number is defined as the number of milligrams of potassium hydroxide equivalent to the free carboxyl groups present in one gram of the resin. In general, resins having amine or acid numbers within a range of 5 to 100 are preferred for the present purposes.

The polymeric fatty acids employed in preparing the polyamides are those resulting from the polymerization of drying or semidrying oils or the free acids or simple aliphatic alcohol esters of such acids. Suitable drying or semidrying oils include those from soyabean, linseed, tung, perilla, oiticica, cottonseed, corn, tall, sunflower, safflower, dehydrated castor, and the like. In the polymerization process for the preparation of the polymeric fat acids, the fatty acids with sufficient double bond functionality combine for the most part, probably by a Diels Alder mechanism, to provide a mixture of dicarboxylic and higher polymeric acids. The most common of these dimerized acids is dilinoleic acid, a 36-carbon unsaturated dibasic acid. The acids resulting from the dimerization process which possess insufficient functionality to react, remain as monomers and may be wholly or partially removed, as by distillation. The residue after distillation consists of the desired polymeric acids, and this mixture is used for the preparation of the polyamide resin. The term "polymeric fat acids" as used herein is intended to include the polymerized mixture of acids obtained, which mixtures usually contain a predominate portion of dimeric acids, a smaller quantity of trimeric and higher polymeric acids, and some residual monomer.

These polymeric fat acids may be reacted with a variety of aliphatic polyamines for the production of the polyamide resin. The amidification reaction may be carried out under the usual conditions employed for this purpose. Polyamides of this type generally have molecular weights varying from 1,000 to 10,000 or higher, and are resistant to the corrosive action of water, alkali, acids, oils, greases, and organic solvents. For the purposes of the present invention, polyamide resins must be either in the form of liquids and must have a viscosity in the range of 5000–18000 centipoises, or the resin must be diluted, preferably with an amine, to form a curing system having a viscosity in this range.

Even in those instances where the polyamide resins used as curing agents for the epoxy resins in the present composition possess an excess of amine groups, it is preferred to add additional amines to hasten the cure. Examples of suitable amines are ethylene diamine, diethylene triamine, triethylenetetramine, triethylamine, amino ethyl piperazine, diethanolpropylamine, triethanolamine, tri-dimethylamino-methylphenol, and benzyl dimethyamine, among others. Increased amounts of such amines will increase the speed of the cure and aid in adjusting the viscosity of the curing system to the stated limits. These amine additives are preferred since room temperature cures are generally involved in the curing of the composition of the present invention.

The amount of epoxy resin to be used in the composition of the present invention will be 8–20% by weight epoxy resin, or mixture of epoxy resins, based on the weight of the total composition. Preferably, the amount will be 9–13% by weight epoxy resin. Amounts larger than the stated maximum will produce a composiiton which is sticky and which does not possess the requisite lubricity, while amounts smaller than the stated minimum will produce a cured composition which does not have sufficient strength to withstand the heavy wear to which the composition of the present invention is normally subjected.

The amount of polyamide curing system to be used will vary between 1–10% by weight of the polyamide resin plus polyamines based on the total weight of the system. As further proviso, the polyamide curing system will always be present in an amount of about 1–50% by weight based on the weight of the epoxy resin. If the relative amount of the polyamide curing system is too great, the binder will not possess the requisite properties of easy workability and strength after cure. If the relative amount of the curing system is too small, incomplete cure or unduly extended cure time will result.

The graded filler will always be present in an amount of 60–90% by weight of the total composition, and more preferably in an amount of 75–85% by weight. Occasionally, it is desirable to use a pigment in order that marking lines, divisions, or other indicia may be utilized in a pavement or flooring composition by application of compositions of the present invention having different colors. In accordance with the art, pigments having the ability to withstand the particular use should be chosen. Pigments will generally be present in an amount of about 2–10% by weight based on the total weight of the composition.

The unexpected properties of the composition of the present invention appear to result from use of the proper amounts of a binder system having the proper viscosity in relation to the surface area present in the graded filler. If binder viscosities or filler sizes or both are outside of the limits set above, the composition of the present invention will not possess the unexpectedly superior properties of handleability which render use of this composition so time saving and money saving.

The composition of the present invention should be thoroughly blended before use, and applied within a few hours. The epoxy resin and the polyamide resin system may be blended, and then the graded filler and pigment may be added thereto with mixing. Mixing may be done by hand but is more preferably done mechanically. Good mixing is essential, since to the extent that the mixing does not produce a uniform mixture, portions will have insufficient binder distributed over the surfaces of the filler particles, thus producing a weaker area.

Once intimate mixing and dispersion is accomplished, the composition is ready to be spread over a floor, stair tread, vehicle bed, road, or other surface to be covered by means of a trowel or other suitable spreading device. The thickness of the layer to be applied will depend on the use and traffic conditions. A coating of 1″ or more thick might be useful on a bridge or other roadway application, while ⅛″ or ¼″ may well suffice as the flooring for a bus or subway car. The workability characteristics of the composition of the present invention are such that the surface is easily worked smooth in the sense of being homogeneous, while at the same time, due in part to the sizes of the filler, the surface presents an excellent skid-resistant surface for both pedestrian and vehicular traffic. Where enhanced skid resistance is desirable, abrasive grits or grains may be added in small amounts, usually no more than 10% by weight, as a replacement for the graded filler, and having the same size as the graded filler.

The composition of the present invention will cure at room temperature or less in a matter of hours. Elevated temperatures hasten cure. As emphasized earlier, the time for cure is easily controllable by varying the amount of amine which is added to the polyamide resin. For some applications such as a busy highway or bridge, a shortened period of cure may be desirable.

The graded filler may preferably be sand, silicon dioxide, or any of the inorganic, mineral aggregates having sufficient strength, and falling within the defined size range will suffice. The nature of the binder system is such that it will wet the surfaces of all mineral inorganic aggregates, hence the unexpected properties of the trowelable composition of the present invention will be realized so long as the binder system possesses the proper viscosity and the filler system possesses the proper size range.

The following examples illustrate several embodiments of the invention. All parts and percentages are by weight unless otherwise stated.

Example 1

Two compositions were made up, each having the following ingredients in the following amounts:

| Ingredients: | Parts |
|---|---|
| Epoxy resin, reaction product of epichlorohydrin and 2,2-bis-(4-hydroxyl phenyl) propane, 18000 centipoises | 424 |
| Reactive diluent resin, made of poly(butyl glycidyl ether), 3 centipoises | 103 |
| Polyamide resin, made by reacting a fat acid with a polyamine (Versamid 125) | 106 |
| Tridimethylamino-methylphenol | 26 |
| Sand filler | 3850 |
| Pigment | 235 |

The viscosity of the mixture of polyamide and amine-curing system was 16000 centipoises.

The only difference in the two above-described compositions was in the sieve analysis of the graded filler used in each case. No. 1 composition contained a specially graded silica sand composition while No. 2 composition contained a standard No. 1 coarse silica sand composition. Following are the sieve analyses of the fillers in each case.

| U.S. Standard Sieve No. | Percent Retained No. 1 Composition | Percent Retained No. 2 Composition |
|---|---|---|
| 14 | 5.2 | 3.8 |
| 16 | 15.2 | 8.1 |
| 18 | 22.6 | 13.8 |
| 20 | 16.6 | 11.4 |
| 30 | 19.1 | 13.7 |
| Passed through 30 | 21.3 | 49.2 |

Both compositions were admixed in an identical manner and used to reface a cracked concrete surface out-of-doors.

The No. 1 composition had an excellent short-bodied texture, was easily workable, and did not adhere to the trowel; no wiping or dipping was necessary. The No. 2 composition was difficult to work; greater effort was needed to trowel the composition to a ¼″ thick coating. Additionally, the trowel used during the working of the No. 2 composition picked up smears of the composition which tenaciously adhered to the trowel. It was necessary to wipe the trowel clean during the entire trowelling operation and to dip it into kerosene frequently to lubricate it. Application of the No. 2 composition took approximately three times as long as application of the No. 1 composition. The amounts of the two compositions used and the areas covered were the same.

Example 2

The following composition was made:

| Ingredients: | Parts |
|---|---|
| Epoxy resin, reaction product of epichlorohydrin and bis-phenol, 18000 centipoises | 848 |
| Poly(butyl glycidyl ether) | 206 |
| Polyamide resin, reaction product of fat acid and polyamine | 256 |
| Triethylenetetramine | 41 |
| Graded sand filler | 8100 |
| Aluminum oxide, 30 grit | 900 |
| Titanium dioxide | 100 |
| Carbon black | 2 |

The viscosity of the polyamide-containing curing system was 15000 centipoises.

The following screen analysis was obtained on the graded filler:

| U.S. standard sieve No.: | Percent retained |
|---|---|
| 14 | 6.0 |
| 16 | 13.5 |
| 18 | 22.0 |
| 20 | 17.6 |
| 30 | 21.5 |
| Passed through 30 | 19.4 |

The composition gave excellent working properties and did not adhere to the trowel. A ¼″ thick film spread over a stainless steel base cured in 16–24 hours at 75° F. to give a tough, strong, skid-resistant surface.

We claim:

1. A trowelable nondragging short-bodied flooring composition which will not stick to the trowel during working comprising a well blended mixture of (a) from 8–20% by weight of a curable epoxy resin having a viscosity in the range of about 400–3000 centipoises at 75° F. and formed by the reaction of a bis-phenol with an excess of epichlorohydrin in the presence of an alkali, (b) a curing system for the epoxy resin having a viscosity in the range of 5000–18000 centipoises at 75° F. comprising from 1 to 10% by weight of a polyamide obtained by reacting a polymeric fat acid and a polyamine, and (c) from 75 to 85% by weight of a graded, inorganic, mineral aggregate filler having a sieve analysis of

| U.S. standard sieve No.: | Percent by weight retained |
|---|---|
| 14 | 4–7 |
| 16 | 12–18 |
| 18 | 20–26 |
| 20 | 8–22 |
| 30 | 14–30 | with the proviso that substantially 100% by weight of said graded filler pass through a No. 10 sieve and a maximum of 35% by weight pass through a No. 30 sieve.

2. A composition according to claim 1 wherein said curing system for the epoxy resin also includes an amine selected from the group consisting of ethylene diamine, diethylene triamine, triethylenetetramine, triethylamine, amino ethyl piperazine, diethanolpropylamine, triethanolamine, tridimethylamino-methylphenol, and benzyl dimethylamine.

3. A composition according to claim 1 wherein said epoxy resin possesses a viscosity in the range of 1200–1600.

4. A composition according to claim 1 wherein said polyamide resin curing system has a viscosity in the range of 13000–18000.

5. A composition according to claim 1 wherein said graded filler comprises silica sand.

References Cited by the Examiner

UNITED STATES PATENTS

| | | |
|---|---|---|
| 2,934,452 | 4/1960 | Sternberg. |
| 2,944,036 | 7/1960 | Floyd et al. |
| 3,018,260 | 1/1962 | Creighton. |
| 3,050,493 | 8/1962 | Wagner et al. |

OTHER REFERENCES

"Epoxy Coating Planned for Parkway Bridges" (Goldberger), Roads and Streets, August 1961, pp. 68–71.

Lee et al.: "Epoxy Resins," McGraw-Hill Book Co., Inc., New York, 1957, page 15 and ch. 6.

Parry et al.: Industrial and Engineering Chemistry, 49 (1957) (No. 77, 1103–1104 (1957)).

MORRIS LIEBMAN, *Primary Examiner.*

MILTON STERMAN, *Examiner.*

T. K. KERWIN, J. W. BEHRINGER, A. H. KOECKERT, *Assistant Examiners.*